United States Patent [19]

Brugnoli

[11] Patent Number: 4,909,137

[45] Date of Patent: Mar. 20, 1990

[54] COOKING GRILL GREASE CATCHER

[76] Inventor: Giuliano Brugnoli, 66-32 60th Pl., Ridgewood, N.Y. 11385

[21] Appl. No.: 276,619

[22] Filed: Nov. 28, 1988

[51] Int. Cl.⁴ .............................................. A47J 37/07
[52] U.S. Cl. ........................................ 99/444; 99/400; 99/446
[58] Field of Search ................. 99/444, 445, 446, 400, 99/425, 403, 407; 141/331, 334

[56] References Cited

U.S. PATENT DOCUMENTS

| | | | |
|---|---|---|---|
| 2,811,099 | 10/1957 | McGoldrick | 99/444 |
| 3,455,233 | 7/1969 | Cable | 99/446 X |
| 3,593,647 | 7/1971 | Copeland, Jr. | 99/446 X |
| 3,623,423 | 11/1971 | Berger | 99/446 |
| 3,805,688 | 4/1974 | Gvozdiak | 99/425 |
| 4,094,295 | 6/1978 | Boswell et al. | 99/444 X |
| 4,355,570 | 10/1982 | Martin et al. | 99/446 |
| 4,432,274 | 2/1984 | Kurotaki | 99/446 X |
| 4,454,805 | 6/1984 | Matthews | 99/446 X |
| 4,773,319 | 9/1988 | Holland | 99/446 |

FOREIGN PATENT DOCUMENTS 112263 6/1984 European Pat. Off. .............. 99/403

Primary Examiner—Stephen Marcus
Assistant Examiner—Christine A. Peterson
Attorney, Agent, or Firm—Collard, Roe & Galgano

[57] ABSTRACT

A cooking grill of the type having a grill body has a heat producing element and a grill element defining a cooking surface on which food is placed to be cooked. The cooking surface is spaced above the heating element, with a grease pan supported within the grill body, intermediate the grill element forming the cooking surface and the heat producing element. The grease pan has a size substantially the same as the cooking surface defined by the grill element and includes a grease outlet at a bottom surface thereof. The gas grill includes a grease reservoir mounted externally of the grill body normally suspended from a bottom surface thereof. A grease collection system is housed within the grill body and extends between the grease outlet on the bottom surface of the grease pan and the grease reservoir. In order to facilitate the flow of grease from the grease pan to the reservoir, the bottom surface of the grease pan slopes downwardly towards the grease outlet.

2 Claims, 1 Drawing Sheet

COOKING GRILL GREASE CATCHER

BACKGROUND OF THE INVENTION

1. Field of the Invention

The invention relates to an improved grease catching for a cooking grill. In particular, the invention relates to a grease catching pan located intermediate the cooking surface and a grate supporting the charcoals or, in the case of gas and electric grills, the artificial charcoals.

2. Description of the Prior Art

Various prior art patents have addressed the problem of catching the grease or other drippings which fall from the food being cooked on the cooking surface of gas, electric, or charcoal grills. U.S. Pat. No. 3,959,620 to Stephen discloses an electric barbecue grill having a grease cup located at the bottom of a kettle-like body in order to catch grease drippings. U.S. Pat. No. 3,989,028 to Berger discloses a sloping tray supporting the charcoal brickets within a grease cup located at the bottom thereof. U.S. Pat. No. 4,089,258, also to Berger, discloses a barbecue unit, in which a grease cup is connected to the bottom of a drip plate which is tilted slightly with respect to the cooking unit.

U.S. Pat. No. 4,403,540 to Erkelenz discloses the use of a grease cup in combination with a slope and groove grease pan, which is crisscrossed with a group of intersecting channels forming drainage towards a trough. U.S. Pat. No. 4,574,770 to Wells discloses a cooking apparatus with grease catching elements. None of these prior art patents disclose a sloping grease catching pan located above the gas, electric, or charcoal cooking elements and immediately underneath the grill which supports the food being cooked.

SUMMARY OF THE INVENTION

It is an object of the invention to provide an improved cooking grill of the type using gas, electric, or charcoal to produce the heat to cook the food.

It is yet another object of the invention to provide an improved cooking grill of the type having a grease catching pan located intermediate the heat producing elements in the grill and the surface supporting the food to be cooked.

It is yet another object of the invention to provide an improved cooking grill, which is simple in design, easy to manufacture, easy to use, and which captures the grease produced by the food being cooked prior to its coming into contact with the heating element.

Accordingly, these and other objects are achieved by an improved cooking grill of the type having a grill body housing a heating element, either in the form of a gas burner, electric burner, or charcoal, and a grill element defining a cooking surface on which food is placed to cook. The grill element is spaced a predetermined distance above the heating element to produce the desired rate of cooking. A grease pan is mounted within the grill body intermediate the grill element and the heat producing element and has a size substantially the same as the cooking surface defined by the grill element. The grease pan has a grease outlet on a bottom surface thereof that is sloped downwardly toward the grease outlet. A grease reservoir is mounted externally of the grill and may be in the form of a cylindrical container positioned under an opening in the bottom of the grill body. A grease collection system in the form of a funnel having a widened and narrowed end, with the widened end supported below the grease outlet in the grease pan is provided. This system further includes a tubular conduit coupled to the narrow end of the funnel and extending through the grill body, through the opening in the bottom of the grill and into the grease reservoir.

The grease pan includes at least one peripheral edge thereof, having an upwardly extending flange serving as a stiffening means to prevent the downward deflection of the grease pan. This upwardly extending flange can, of course, extend around the entire periphery of the grease pan. It has been found advantageous to removably support the grease pan in the grill body by supporting the peripheral edges of the pan on either a support ledge formed on the interior walls of the grill body, or on support elements fixedly attached to the interior walls of the grill body. It has also been found advantageous to include vent holes formed in the bottom surface of the grease pan, around the periphery thereof, to allow combustion products to vent through the gill body to the atmosphere.

These and other objects and advantages of the present invention will become apparent from the following description of the accompanying drawing, which discloses one embodiment of the invention. It is to be understood that the drawing is to be used for purposes of illustration only, and not as a definition of the invention.

BRIEF DESCRIPTION OF THE DRAWING

Further advantages and details can be gleaned from the drawing, wherein similar reference numerals denote similar elements throughout the two views.

DESCRIPTION OF THE PREFERRED EMBODIMENT

Figure 1:
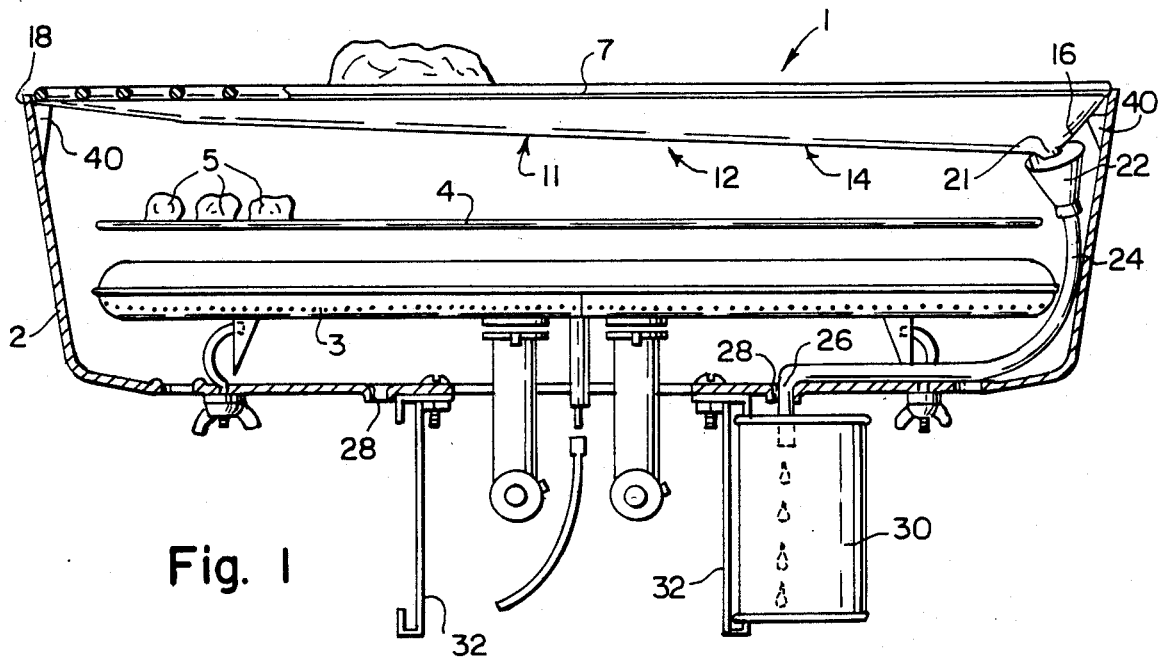
FIG. 1 is an elevation view, partially in cross section, of the cooking grill with the grease catching pan of the present invention.
Figure 2:
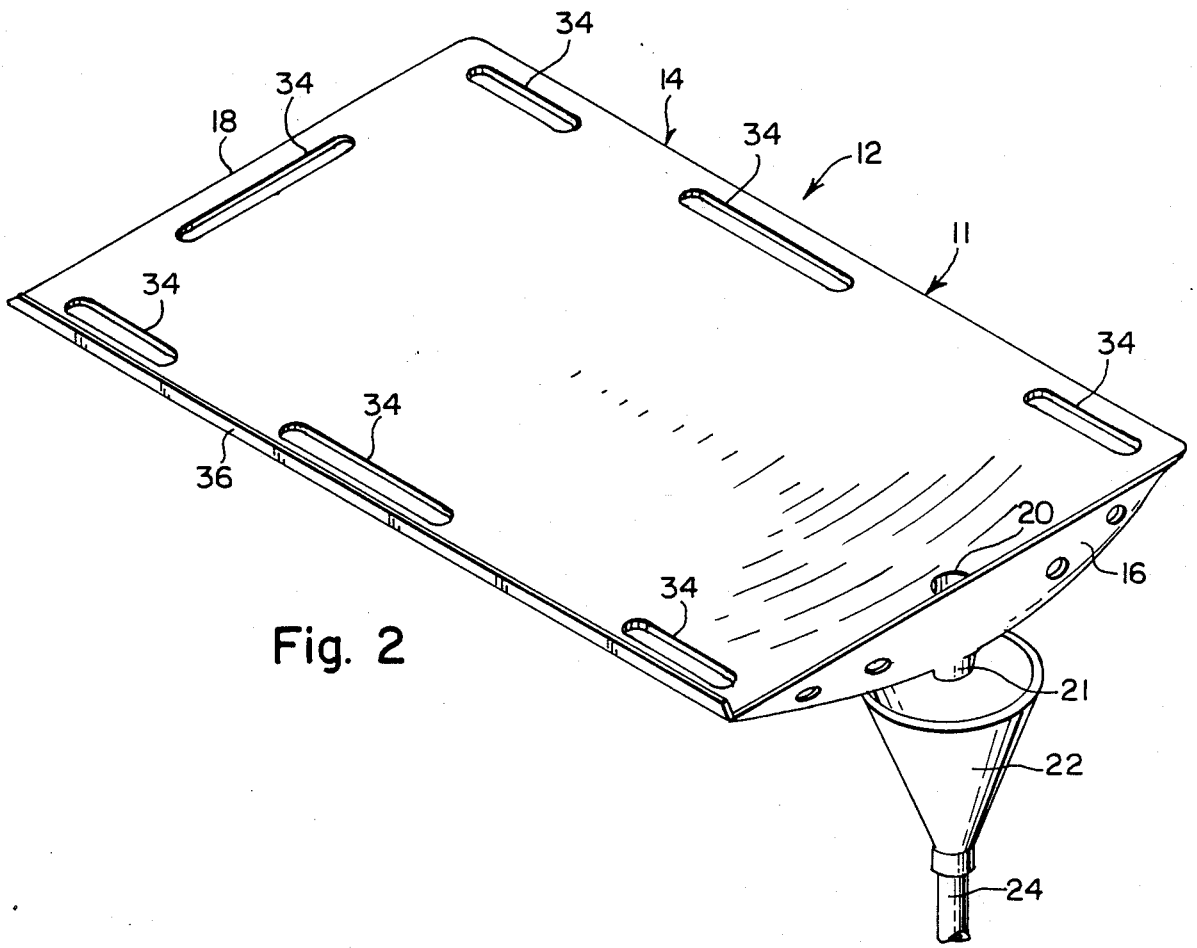
FIG. 2 is a perspective view of the grease catching pan and the grease transfer system of the present invention.

Referring to FIG. 1, there is shown a gas grill, generally denoted at 1, having a body 2 and containing a standard gas burner 3. Located above gas burner 3 is a grate 4, supporting artificial charcoal brickets 5. A grill element 7 is provided, on which the food is cooked. A grease catching system, generally denoted as 12, is provided immediately under the grill element 7 to catch grease drippings occurring during the cooking operation.

Referring to both figures, there is shown grease catching system 12 which is comprised of a grease catching pan 11 made from a formed metal plate 14 shaped in the form of an inclined trough, having a depth greater at an end 16 than at end 18 thereof. Plate 14 has an opening 20 at the lowest portion outlet 21, formed from the bottom of plate 14. Outlet 21 may be in the shape of a spout. Spout 21 communicates with the wide end of a funnel 22, the narrow end of which communicates with a conduit 24. Conduit 24 extends through the interior of grill body 2 and includes a terminal section 26 extending through a hole 28 in the bottom of the grill and into a grease catching reservoir in the form of container 30. Container 30 may be suspended from the bottom of gas grill 1 in any convenient manner, such as by a hanger system 32, shown in FIG. 1.

Grease catching pan 14 is formed from any metal, such as sheet steel or copper, and has a shallow U- shaped cross section, which increases in depth from end 18 to end 16. Hole 20 is located at the bottom of the U-shaped cross section at end 16 and is therefore at the lowest point on grease catching pan 11, ensuring that grease flows through outlet spout 21. Pan 11 also includes a plurality of vent holes 34 around the periphery of plate 14, which holes allow combustion gases produced by the cooking fuel to escape therethrough. Plate 14 also has a stiffening member 36 in the form of an upturned flange along at least one side thereof, to ensure the rigidity of the pan. Of course, upturned flange 36 can be placed along all sides of the pan 14 to ensure a rigid structure.

In the preferred embodiment, the size and shape of grease catching pan 14 is substantially equivalent to that of cooking grill 7 and, as is usually the case, about the same size as the top opening of the grill body 2. Pan 14 may be supported around the periphery of gas grill body 2 in any well known manner, such as by forming a ledge 40, around the inside of the walls thereof. This ensures that the grease catching pan 14 is immediately below grill element 7, but above grate 4 supporting brickets 5. The heat produced by gas burner 3 heats the bottom surface of pan 14 and is then transferred via convection and radiation to the food being cooked. Grease drippings falling on the top surface of grease pan 14 flow downuardly from end 18 towards end 16 and finally through hole 20 and spout 21. From this point, they are carried via conduit 24 to grease reservoir 30. Because of the heat directed towards the bottom surface of pan 14, some smoke, and therefore, "barbecue flavor" is produced, but the creation of large amounts of smoke is avoided, since the grease does not fall on brickets 5.

It can be seen that while a gas grill 1 is shown in the drawing, the present invention could equally as well be used with an electric grill, or even a grill utilizing charcoal brickets, as long as grease catching pan 11 is interposed between the heating element and the grill element forming the cooking surface. The grease collection system comprising funnel 22 and conduit 24 with terminal section 26 may be made from sheet metal formed in the appropriate shape. It has been found that steel or copper tubing may be used for conduit 24 and terminal section 26. Container 30 may be an empty soup can which can be discarded when full.

While one embodiment of the present invention have been illustrated and described, it is obvious that many changes and modifications may be made thereunto, without departing from the spirit and scope of the invention.

What is claimed is:

1. In a cooking grill of the type having a grill body, a heat producing element, and a grill element spaced above the heat producing element and defining a cooking surface on which food is placed to cook, the improvement comprising:
   a grease pan removably mounted within the grill body intermediate the grill element and the heat producing element and having a size substantially the same as the cooking surface defined by the grill element, said grease pan having a grease outlet through a bottom surface thereof, said grease pan having a bottom surface which slopes downwardly toward said outlet;
   a container serving as a grease reservoir suspended from a bottom of said grill body;
   grease collection funnel, having a widened and narrowed end, said widened end supported below said grease outlet in said grease pan;
   a tubular conduit coupled to the narrowed end of said funnel and extending through an opening in the bottom of the grill body and into said grease reservoir;
   an upwardly extending flange formed along one peripheral edge of said grease pan for stiffening said grease pan and as a supporting surface for mounting said grease pan along one edge of the grill body;
   a plurality of vent holes, disposed along the peripheral edges of said grease pan to allow combustion products of the heat-producing element to vent through said grease pan to the atmosphere; and
   support surfaces fixedly attached to the interior walls of the grill body substantially adjacent an upper end thereof so as to support the peripheral edges of said grease pan.

2. The cooking grill, as defined in claim 1, wherein said upwardly extending flange formed along one peripheral edge of said grease pan extends therealong for the entire length of the peripheral edge of said grease pan.

* * * * *